H. P. DAVIS.
TROLLEY HANGER.
APPLICATION FILED APR. 10, 1908.
931,392.
Patented Aug. 17, 1909.
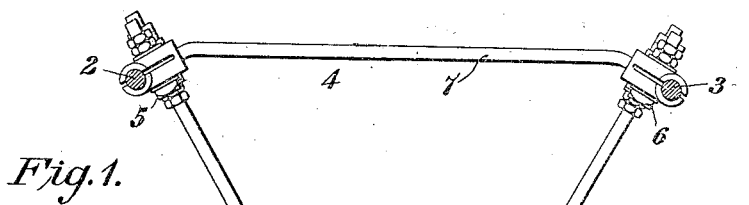
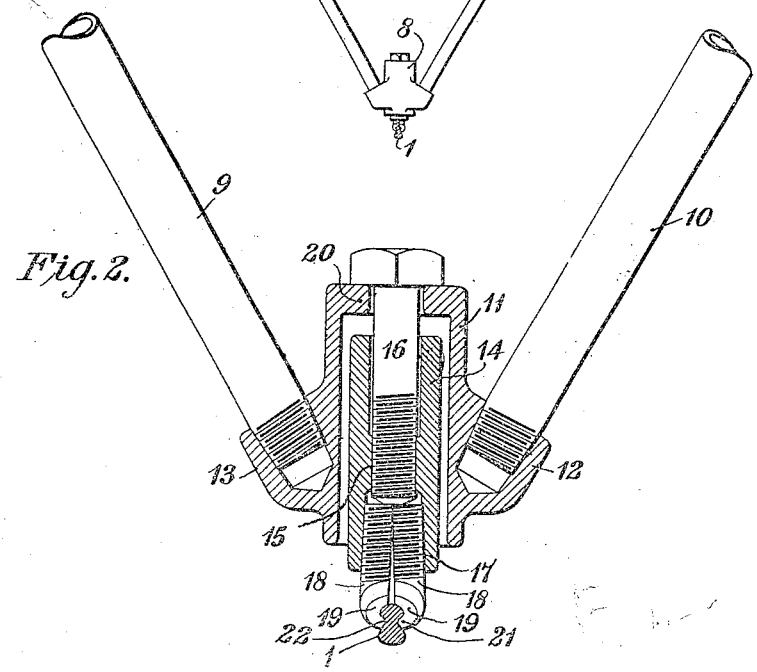
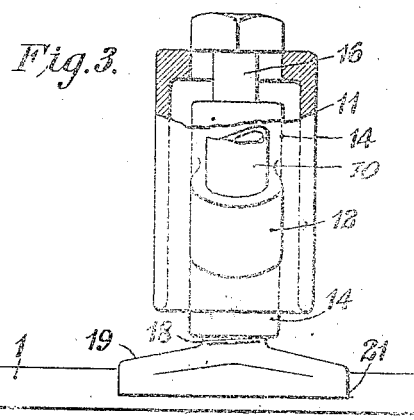

UNITED STATES PATENT OFFICE.

HARRY P. DAVIS, OF PITTSBURG, PENNSYLVANIA, ASSIGNOR, BY MESNE ASSIGNMENTS, TO WESTINGHOUSE ELECTRIC & MANUFACTURING COMPANY, OF EAST PITTSBURG, PENNSYLVANIA, A CORPORATION OF PENNSYLVANIA.

TROLLEY-HANGER.

No. 931,392.

Specification of Letters Patent.

Patented Aug. 17, 1909.

Application filed April 10, 1908. Serial No. 426,288.

*To all whom it may concern:*

Be it known that I, HARRY P. DAVIS, a citizen of the United States, and a resident of Pittsburg, in the county of Allegheny and State of Pennsylvania, have invented a new and useful Improvement in Trolley-Hangers, of which the following is a specification.

My invention relates to overhead line structures for electric railways, and it has for its object to provide an improved device for suspending a trolley conductor from a messenger wire or cable or a plurality of such wires or cables.

In the catenary type of line suspension, as usually installed, the trolley wire is connected to one or more messenger cables by a plurality of rigid hangers each comprising a rod or a frame and clamps which are respectively secured to the cable or cables and to the trolley conductor.

By reason of the rigid nature of the above-mentioned connections, undesirable results are liable to follow any relative longitudinal movement between the trolley conductor and the cable; for example, the trolley conductor is sometimes kinked or bent out of shape near the ends of the trolley clamps. Furthermore, when electric vehicles are operated at high speeds, a relatively high pressure is usually exerted by the trolley or other current collector against the trolley conductor in order to avoid arcing and to insure contact between the engaging parts.

In the use of the rigid hangers of the prior art, the points of connection between the hanger and the trolley conductor have been so unyielding that a material hammering action sometimes took place as the trolley contact shoe passed along the wire, which served to bend the trolley wire at these points and to increase the arcing tendency.

According to my present invention, I provide an improved hanger which is simple and durable in construction and is adapted for suspending a trolley conductor from a messenger cable or a pair of such cables. Moreover, the difficulties of the prior art are largely overcome by permitting vertical and longitudinal movements of the trolley wire relative to the messenger cable or cables and a comparatively slight lateral movement of the wire relative to the cable or cables. A rigid connection is maintained between the hanger rod or frame and the messenger cable or cables in order to avoid frictional engagement between the two parts and wear on the latter.

Figure 1 of the accompanying drawings is an elevation of a hanger constructed in accordance with my invention, and Figs. 2 and 3 are, respectively, a sectional elevation and a side view of the trolley clamp and that portion of the hanger adjacent to it.

Referring to the drawings, a trolley conductor 1 is supported from messenger cables 2 and 3 by means of a plurality of trolley hangers each of which substantially corresponds to that which is illustrated in the drawings.

The trolley hanger 4 comprises cable clamps 5 and 6 which are joined by a spacing rod 7, a trolley clamp 8 and oblique side rods 9 and 10 which, together with the spacing rod 7, constitute a substantially equilateral triangular frame. Any suitable cable clamps may be employed, but I prefer to utilize clamps which are similar to those illustrated and described in Patent No. 803,216, issued October 31, 1905, to the Westinghouse Electric & Manufacturing Company, as assignee of Theodore Varney and myself.

The trolley clamp 8 comprises an outer sleeve 11 having lateral projections or lugs 12 and 13 which are tapped to receive the lower ends of the oblique rods 9 and 10, an inner sleeve 14 having a restricted portion 15 near the middle of its interior which is screw-threaded to receive a bolt 16 and a tapered lower end portion 17 to receive the screw-threaded semi-cylindrical portions 18 of a pair of clamping members 19. The outer sleeve 11 has a partially closed upper end 20 so that the head of the bolt 16 may rest on the end surface and thereby support the sleeve 14 within the sleeve 11. The inner diameter of the outer sleeve 11 is made slightly larger than the outside diameter of the inner sleeve at right angles to the trolley conductor in order that a slight lateral movement of the clamping jaws and the inner sleeve relative to the remainder of the supporting frame may be permitted, while the clearance space between the two sleeves is made considerably larger in the direction of the trolley conductor in order that a longitudinal movement of said conductor relative to the rigid part of the hanger may be permitted. An additional adjustment is permitted by reason of the fact that the inner sleeve 14 is supported at some distance below the end, the weight of the trolley conductor being relied upon to sufficiently oppose the upward pressure exerted by the current collector.

The clamping members 19 are constructed in a well known manner with hooked projections 21 which engage longitudinal grooves 22 in the trolley conductor 1, the necessary clamping action being obtained when the sleeve 14 is screwed down onto the semi-cylindrical portions 18.

It will be understood that my invention may be utilized in connection with a single messenger cable and that other modifications may be effected within its scope.

I claim as my invention:

1. A hanger for electric lines comprising a rigid and substantially triangular supporting frame, cable clamps at two corners of the frame, a sleeve member at the third corner, and a trolley-conductor clamp comprising jaw members, a gripping sleeve and means for so suspending said gripping sleeve in said sleeve member as to permit of vertical and longitudinal movement.

2. In an electric line structure, the combination with a pair of messenger wires or cables, and a trolley conductor, of means for supporting the trolley conductor from the cables, said means comprising a substantially vertical sleeve, hanger rods for supporting the sleeve from the cables, and a trolley-conductor clamp comprising jaw members, a suspending bolt, and a sleeve in the respective ends of which said jaw members and said bolt are seated, said clamp being freely movable vertically and in the direction of the trolley conductor.

3. In an electric line structure, the combination with a pair of messenger wires or cables, and a trolley conductor, of a hanger for suspending the trolley conductor from the cables comprising a substantially triangular frame, cable clamps disposed at two corners thereof, a sleeve member at the third corner, and a trolley-conductor clamp comprising jaw members, a gripping sleeve for said jaw members, and a bolt for so suspending said gripping sleeve within said sleeve member that it may move vertically and in the direction of the trolley conductor.

In testimony whereof, I have hereunto subscribed my name this 31st day of March, 1908.

HARRY P. DAVIS.

Witnesses:
  C. E. SMYERS,
  BIRNEY HINES.